United States Patent [19]
Toyama et al.

[11] 4,278,340
[45] Jul. 14, 1981

[54] CAMERA HAVING AN AUTOMATIC FOCUS ADJUSTING DEVICE

[75] Inventors: Masamichi Toyama, Machida; Noritsugu Hirata, Yokohama; Hideto Iwama, Kawasaki; Hidekazu Okajima, Naka; Akimasa Nishimura, Kawasaki, all of Japan

[73] Assignee: Canon Kabushiki Kaisha, Tokyo, Japan

[21] Appl. No.: 171,378

[22] Filed: Jul. 23, 1980

[30] Foreign Application Priority Data

Jul. 25, 1979 [JP] Japan .................................. 54-94600

[51] Int. Cl.³ .............................................. G03B 3/10
[52] U.S. Cl. ...................................... 354/195; 352/140
[58] Field of Search ..................... 354/25, 195, 196; 352/139, 140, 91 C, 91 S

[56] References Cited

U.S. PATENT DOCUMENTS

| | | | |
|---|---|---|---|
| 3,798,660 | 3/1974 | Hasegawa et al. | 354/25 |
| 3,871,756 | 3/1975 | Stieringer et al. | 354/25 |
| 4,075,639 | 2/1978 | Peterson | 354/25 |
| 4,083,057 | 4/1978 | Quinn | 354/25 |
| 4,183,639 | 1/1980 | Suwa | 354/25 |
| 4,191,460 | 3/1980 | Fujiki | 352/140 |

*Primary Examiner*—Russell E. Adams

[57] ABSTRACT

The present invention relates to a camera having an automatic focus adjusting device, being characterized in that the motor for the focus adjustment is not provided particularly, whereby the motor for the shutter operation and the film feeding is changed over by means of a clutch so as to be used for the focus adjustment.

3 Claims, 9 Drawing Figures

CAMERA HAVING AN AUTOMATIC FOCUS ADJUSTING DEVICE

BACKGROUND OF THE INVENTION

The present invention relates to a camera having an automatic focus adjusting device.

Various cameras of this kind have been proposed and known widely. Some of them have been brought in practical use and sold on the market. In case of this kind of camera in order to drive the automatic focus adjusting device an exclusive electric motor is provided, the driving spring is charged in operative engagement with the film winding operation or the automatic focus adjusting device is manually operated in operative engagement with the shutter release operation.

However, it is remarkably inconvenient to provide a motor exclusively for driving the automatic focus adjusting device from the view point of the manufacturing cost, the internal space and the weight of the camera.

Further, it is also inconvenient to manually operate the automatic focus adjusting mechanism, because the additional strength is needed to wind the film and release the shutter, which destroys the feeling of the photographer.

SUMMARY OF THE INVENTION

The purpose of the present invention is to offer a camera having an automatic focus adjusting device remarkably easy to operate, overcoming the above shortcomings.

For the above-mentioned purpose in case of the present invention, only one electric motor is changed over by means of a clutch means for the film feeding, the shutter operation and the automatic focus adjustment.

Below the present invention is explained in detail in accordance with the accompanying drawings of the embodiment.

DESCRIPTION OF THE PREFERRED EMBODIMENTS

Figure 1:
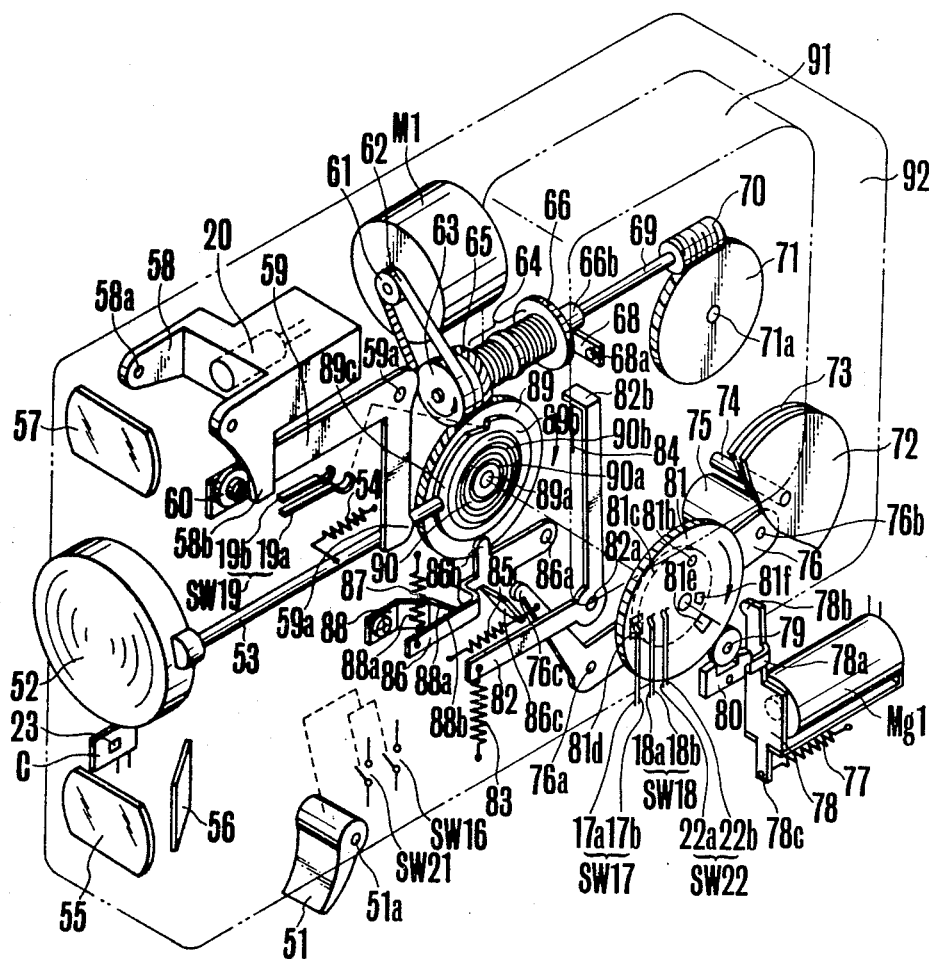
FIG. 1 shows the important elements of the camera in accordance with the present invention in perspective view.

FIG. 1 shows an embodiment of the present invention applied to a camera, whereby 92 in a 2 dot-one dash line shows the contour of the camera, while 91 shows the film cartridge loaded in the camera.

52 is the photographing focusing lens being supported so as to be displaced forwards and backwards by means of a conventional guide means, whereby the operatively engaging lever 53 extending backwards is provided so as to be moved together with 52. 20 is a LED serving as the light source for the automatic focus adjusting device, being held by means of the holder movably linked to the camera body by means of the shaft 58a. 57 is the projecting lens fixed in front of the LED 20, 55 the light receiving lens arranged at a certain determined distance from the projecting lens, whereby a reflecting mirror 56 is slantly provided at the back of the lens 55 so as to lead the light beam passing through the lens 55 to the light sensing element 23 such as silicon photo cell (SPC). C is an amplifier circuit arranged around the photosensing element.

89 is the worm gear arranged so as to be rotatable around the fixed shaft 89a, whereby the start cam 89b and the focusing cam 89c make one body with each other. 81 facing to the gear 89 is a gear rotatable around the gear 89a, whereby 81 makes one body with the pre-scan cam 81c at the side facing to the above focusing cam and is connected to the worm gear 89 by means of a spring 90 whose one end is fixed on the gear 89. 81b is a hole in which the other end of the spiral spring is engaged. 81d is a conductive portion provided on the outer surface of the gear, for making conductive the contacts 17a and 17b constituting the switch SW17 to be explained later. 81e is also a conductive portion for making conductive the contacts 18a and 18b of the switch SW18, while 81f is a conductive portion for making conductive the contacts 22a and 22b of the switch SW22.

79 is the pinion to be engaged with the gear 81, while 80 is the anchor to be engaged with the pinion 79, whereby they constitute a governer for controlling the rotation speed of the gear 81.

59 is the operatively engaging lever linked to the fixed shaft 59a so as to be rotatable around the shaft 59a, whereby the other arm 59a is engaged with the circumference of the above pre-scan cam 81c. The other arm 59b is engaged with the cam arm 58b of the above holder 58 by means of the roller 60 born at the end of the arm 59b. The operatively engaging lever 53 of the above focusing lens is urged backwards by means of the spring 54, whereby the other end is engaged with the circumference of the above focusing cam 89c and that of the pre-scan cam 81c, bridging over both of them. 86 is the start lever supported so as to be rotatable around the shaft 86a, whereby the projection 86b is urged by means of the spring 87 so as to be engaged with the circumference of the above start cam 89b.

82 is the change over lever for the clutch to be explained later, being normally urged by means of the lever 83 so as to be in contact with the stop lever 84. Mg1 is a magnet to be engaged with the signal from the automatic focus adjusting device so as to attract the armature against the strength of the spring 77. The arm 78a of the armature 78 in the not attracted state is engaged with the above anchor 80 so as to keep the gear 81 through the pinion 79. Further, the upper arm 78b of the armature 78 is engaged with the left side of the arm 82b extending upwards of the above change over lever 82, while the arm 78b in the attracted state by means of the magnet Mg1 urges the above lever 82 along the clockwise direction so as to change over the clutch.

88 is the lutch spring for keeping the above change over lever 82 at the change over position by means of the upper edge 88a, consisting of a thin metal plate and having an inclined portion at the lower part.

74 is a capstan to be driven by means of a capstan motor not shown in the drawing, 72 the fly wheel and 73 the belt. 75 is a pinch roller for feeding the film at a constant speed in cooperation with the above capstan and 76 the lever rotatable around the fixed shaft 76a, whereby the pinch roller 75 is rotatably born by means of the shaft 76b provided on the one arm, while the other arm is engaged with the cam 86c of the above start lever 86, being urged by means of the spring 85.

M1 is a motor, whose rotation is transmitted to the pulley 63 through the pulley 61 and the belt 62 so as to selectively rotate the worm 65 engaged with the worm gear 89 or the shutter gear 66. The shutter gear 66 is engaged with a gear not shown in the drawing so as to drive a conventional blade and at the same time drives the conventional film feeding claw 68 by means of the cam 66b making one body with the gear 66. Further, the gear 66 is fixed on the shaft 69 by means of the pin 66a so as to rotate the film winding shaft through the worm 70 and worm wheel 71 fixed at the other end of the shaft 69.

Figure 4:
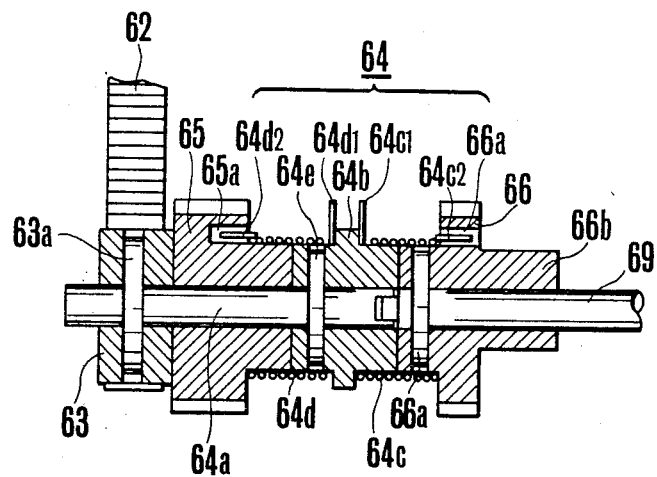
FIG. 4 shows the clutch in detail in section.
Figure 5:
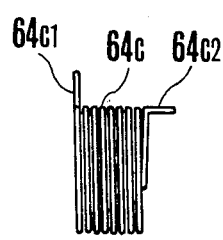
FIG. 5 shows the clutch spring.
Figure 6:
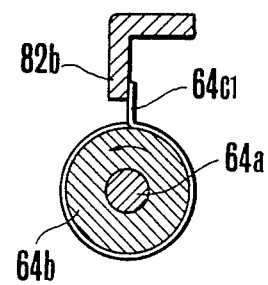
FIG. 6 shows the engagement of the clutch spring with the clutch lever in section.

64 is the spring clutch, whose construction is shown in detail in FIGS. 4 to 6.

As is shown in FIG. 4 the driven pulley 63 is fixed on the shaft 64a by means of the pin 63a, while on the shaft 64a the clutch collar 64b is further fixed by means of the pin 64e. Between the pulley 63 and the collar 64b the above worm 65 is provided so as to be rotatable around the shaft 64a.

At the one end of the shaft 64a the shaft 69 making one body with the above shutter gear 66 is provided so as to be rotated concentrically. The collar 64b and the gears 65 and 66 have hubs with same diameter, whereby the tie spring 64c as is shown in FIG. 5 is wound over the one of the collars 64b and the hub of the gear 64 in such a manner that the one end 64c2 of the spring is engaged in the small hole 66a in the gear 66, while the one end 64c1 at the side of the collar 64b is bent outwards.

Over the other hub of the collar 64b and that of the gear 65 a spring 64d is wound in the same way, whereby the one end 64d2 is engaged in the small hole 65a in the gear 65, while the other end 64d1 is bent outwards. The springs 64c and 64d are wound along the reversed directions to each other.

Along with the rotation of the pulley 63 in this state the collar 64b making one body with the pulley by means of the shaft 64a also rotates so as to transmit the rotation to the gears 65 and 66 through the tie strength of the springs 64d and 64c. When the bent upper portion 82b of the above change over lever 82 is introduced into the path of the upwards bent portion 64c1 of the spring 64c while the shaft is rotating along the direction of the arrow as is shown in FIG. 6, the rotating spring 64c is stopped in such a manner that the diameter of the coil part of the spring is increased, whereby the slip takes place between the spring and the collar so that the rotation of the collar is not transmitted to the gear 66. Further, when the bent portion 82b of the change over lever is engaged with the upwards bent portion 64d1 of the spring 64d, the rotation of the pulley is not transmitted to the gear 65, whereby only the gear 66 rotates.

51 is the release button.

Below, the automatic focus adjusting device will be explained.

Figure 7:
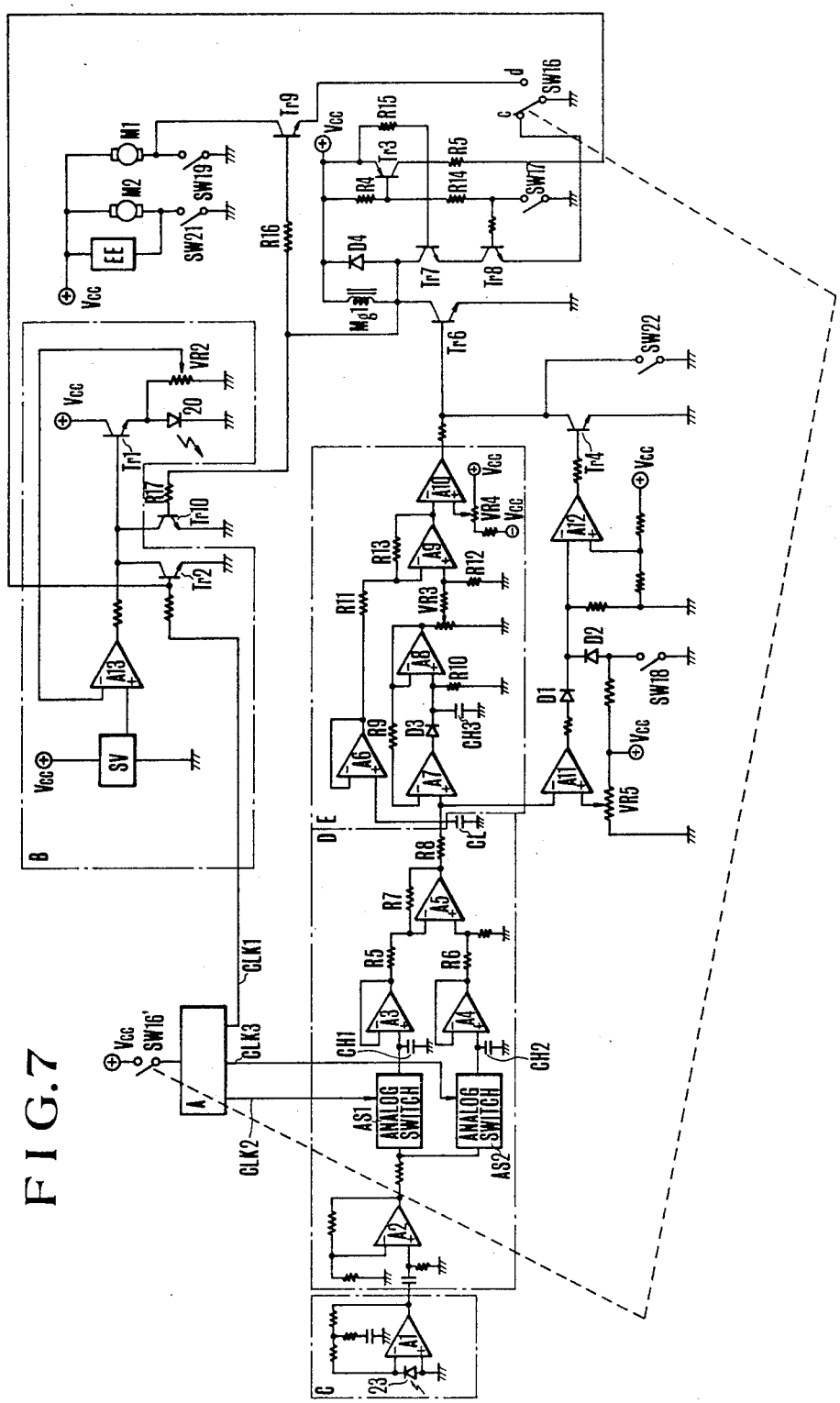
FIG. 7 shows the circuit of the automatic focus adjusting device.

FIG. 7 shows an example of the automatic focus detecting circuit in the automatic focus adjusting device in accordance with the present invention.

The present detecting circuit makes use of a photodiode as light emitting element, having the following specification.

(a) In case the object to be photographed is at the distance at which the light projected from the LED has a certain desired intensity, for example in case the object is within 5 m, the object portion can be detected with sufficient accuracy from the reflected light beam of the LED so that the lens position can be decided by means of the output of the present detecting circuit.

(b) In case the object is at longer distance, the level of the light beam reflected from the object is often lower than that of the noise beam. Consequently, there is a danger that the noise beam should be taken for the detecting light. Thus, the detecting circuit shown in FIG. 7 once detects the level of the beam reflected at about 5 m in such a manner that in case the level is higher than a certain determined level the object is understood to be at about 5 m so as to stop the advance of the lens at this time point.

In case on the other hand the level of the reflected beam is lower than a certain determined level the object is understood to be at longer distance so as to advance the lens up to the middle between the infinite distance and 5 m, say 16 m and set it. In case the lens is set at this position, the depth of field covers from 5 m to the infinite distance in cooperation with the diaphragm device so that regardless of the position of the object an almost sharp picture can be obtained.

Below the detecting circuit having the above efficiency will be explained in detail.

FIG. 7 shows the frequency dividing oscillation circuit A, the LED driving circuit B, the SPC amplifier circuit C, the sample hold circuit D, the peak detecting circuit E, the level detecting circuit, the magnet control circuit, the motor control circuit and so on.

The frequency dividing oscillation circuit A is supplied with a current (Vcc) through the switch SW16 to be closed with the second stroke of the button 51. Hereby, a signal with a certain determined frequency is produced as frequency divided signals CLK1-CLK3 through the frequency dividing circuit.

The LED driving circuit B consists of the constant voltage circuit SV, the voltage level detecting operational amplifier A13, the voltage set resistance VR2, the transistors Tr1, Tr2, the LED 20 and so on. The transistor Tr2 becomes conductive by means of the frequency divided signal CLK1 in such a manner that the transistor Tr1 is brought into the switched off state, while the LED 20 is also brought into the switched off state. On the other hand, along with the switching off of the transistor Tr2 the LED 20 is also brought in the switched on state.

Consequently, the LED 20 periodically flickers with the frequency divided signal CLK with a certain frequency such as 10 KHz.

The amplifier circuit C consists of a photosensing element such as SPC 23, resistances, condensers and an operational amplifier A1, whereby in the feed back circuit of the operational amplifier A1 a low pass filter is formed.

The output of SPC 23 is simplified by means of the operational amplifier A1 so as to be delivered to the sample hold circuit D in the next step.

The sample hold circuit D and the peak detecting circuit E respectively consist of the analog switches AS1 and AS2 to be made conductive with the output signals CLK2 and CLK3 of the frequency dividing circuit A, the sample hold condensers CH1–CH3, the operational amplifiers A2–A10, the resistances R5–R13, the variable resistances VR3 and VR4, the smoothing condenser CL and the diode D3. The outputs CLK2 and CLK3 of the frequency dividing circuit A are inversed in phase at 180° to each other so that the analog switches AS1 and AS2 alternatively assume the conductive state in synchronization with the lighting of the LED 20 so as to divide the output of the SPC amplifier circuit C in a time dividing way in order to hold the condensers CH1 and CH2. Thus, only the variable in accordance with the lapse of time of the output SPC 23 is taken out and smoothed by means of the condenser CL. Hereby, the resistance and the condenser connected to the input terminal of the operational amplifier A2 constitutes a high pass filter.

The condenser CH3 holds the increasing amplified signal for a little while by means of the effect of the diode D3 and starts to discharge with a certain determined discharge time constant through the discharge circuit consisting of R10 when the increasing output of the SPC 23 turns to decrease, after reaching a peak, whereby by selecting a large time constant the peak value can be kept for a certain determined time. The amplified output of the operational amplifier is, having been divided by means of the variable resistance VR3, applied to the non-inversing input of the operational amplifier A9, while to the inversing input of the operational amplifier A9 the output of the operational amplifier A6 is applied. When the increasing output of the SPC has passed the peak value the output of the operational amplifier A6 turns to decrease, whereby the variation signal is reproduced in D.C. component, so that in case the time constant of the resistance R10 and the condenser CH3 is sufficiently large as mentioned above the both input levels of the operational amplifier A9 correspond to each other after the lapse of a certain determined time after the output of the SPC 23 has passed the peak value. Because the inversed input level of the operational amplifier A9 is higher than the non-inversed input level until this time point, the magnet Mg1 continues to be excited through the operational amplifier A10 and the transistor Tr6.

When the both inputs of the operational amplifier A9 correspond to each other, the magnet Mg1 is no more excited so as to fix the pre-scan cam 81c at a position.

In the above circuit, the signal level detecting portion consists of the operational amplifiers A11, A12, the transistor Tr4, the diodes D1, D2, the level setting variable resistance VR5, the 5 m switch SW18, the 16 m switch SW22 and other resistances. To the non-inversing input of the operational amplifier A11 the above variable resistance VR5 is connected so as to make comparison with the level of the condenser CL.

When the advance position of the lens is within 5 m, the switch SW18 is in the switched off state, so that to the input of the operational amplifier A12 a high level signal is applied through the diode D2 so as to keep the transistor Tr4 in the switched off state.

When the advanced position of the lens is just 5 m, the switch SW18 is closed, whereby when the signal level of the condenser CL is higher than that set with the resistance VR5, the transistor Tr4 is brought in the switched on state through the diode D1 and the operational amplifier A12 so as to compulsorily bring the magnet Mg1 into the non-excited state.

When on the other hand the signal level of the condenser CL is lower, the transistor Tr4 remains in the switched off state, whereby the magnet Mg1 continues to be excited. When then the switch SW22 is closed so as to bring the magnet Mg1 into the non-excited state, the pre-scan cam 81c is fixed in such a manner that the focusing lens 52 stops at the position of 16 m.

Further, the magnet control circuit and the motor control circuit consist of the transistors Tr3 and Tr6–Tr10, the magnet Mg1, the diode D4, the film driving motor M1, the capstan motor M2, the exposure control circuit EE, the switches SW16, SW17, SW19, SW21, the resistances and so on. Hereby, Vcc is the level of the power source.

The present circuit is intended to control the switching on and off of the magnet Mg1, the motors M1 and M2, the exposure control circuit EE and the LED 20 by switching on and off the switches SW16, SW17, SW19 and SW21.

Further, the switch SW21 is closed with the first stroke of the release button 51, while the switch SW16 is changed over from the point c to the point d with the second stroke of the release button 51.

Other switches SW17–SW19 and SW22 are all automatically closed and opened.

Below, the operation of the camera constructed as above in accordance with the present invention will be explained.

Figure 2:
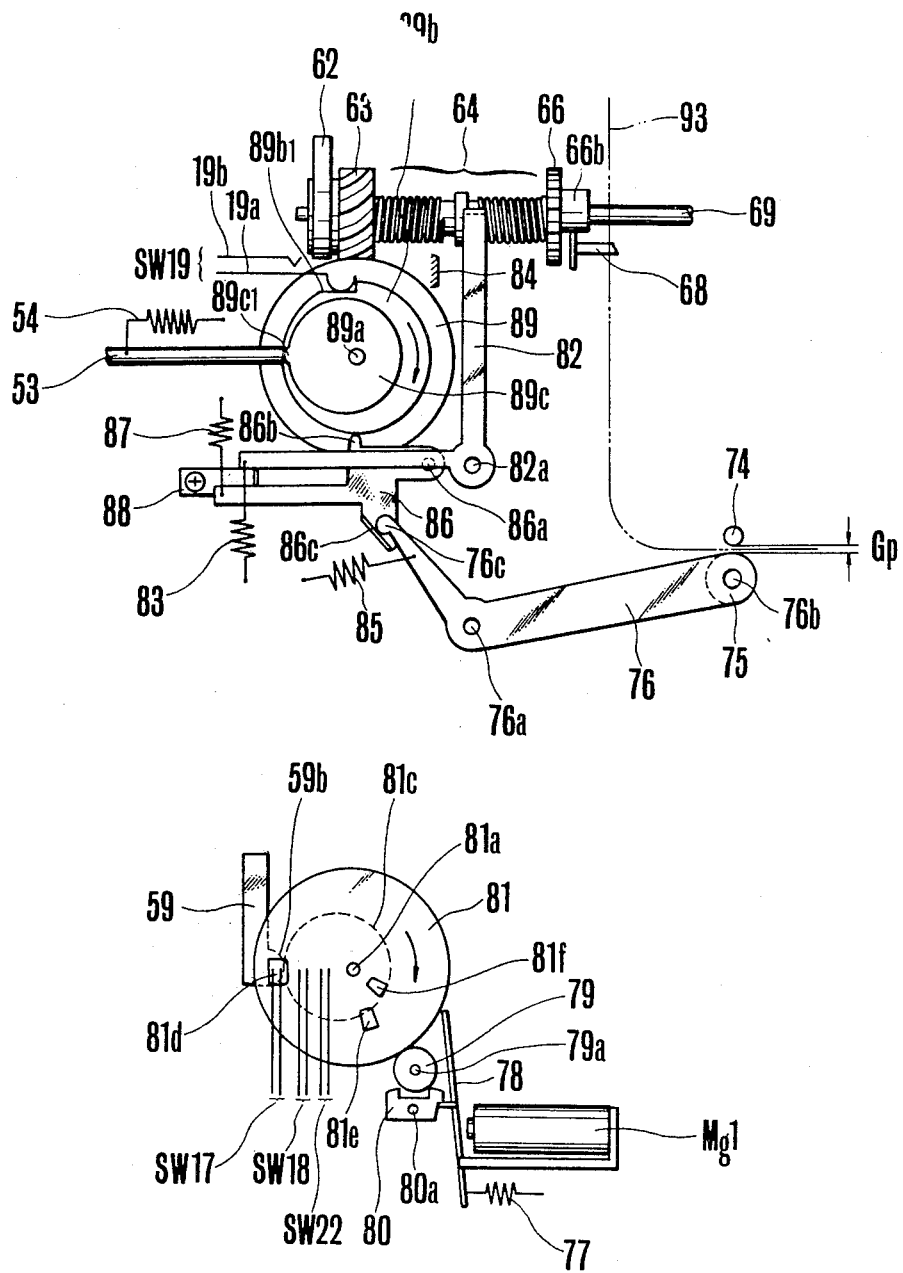
FIG. 2(A) shows the relation of the focus cam with the clutch in the initial state.
FIG. 2(B) shows the state of the pre-scan cam in the above state.

FIG. 1 and FIG. 2 show the present camera in a stationary state. In this state, the focusing lens 52 is advanced into the frontmost position, whereby a very near position is in focus. Further, the operatively engaging lever 53 is over the projection 89c1 of the focus cam 89c, while the pre-scan cam 81c stops at the position corresponding to the very near position by means of the engagement of the above armature with the anchor 80 but is not in contact with the operatively engaging bar. Further, the above operatively engaging lever 59 is in contact with the circumference of the pre-scan cam 81c. When the release button 51 is pushed in this state, the switch 21 is closed. Thus, the EE circuit and the capstan motor M2 is driven. When the release button 51 is further pushed, the switch SW16 is changed over from c to d, whereby the above automatic focus detecting circuit operates so as to excite the magnet Mg1. Thus, the armature 78 is attracted, whereby the arm 78a releases the anchor 80. Consequently, the gear 81 starts to rotate along the clockwise direction by means of the spring 90 energized in advance, whereby the holder follows, rotating through the operatively engaging lever 59 in such a manner that the light beam emitted from the LED 20 scans the object. The light sensing element SPC secures the light reflected from the object through the lens 55 so as to bring the transistor Tr6 of the above focus detecting circuit into the switched off state.

Thus, the current supply to the magnet Mg1 is interrupted and the armature 78 rotates by means of the strength of the spring 77 and again engages with the anchor 80 so as to stop the pre-scan cam 81c. In this way the position at which the focusing lens 52 is to be stopped is preset.

Further, because the magnet Mg1 is in the non-excited state, the transistor Tr9 is in the switched on state, while the transistor Tr10 is also in the switched on state. Thus, the film driving motor M1 is driven, while the LED 20 is switched off.

At this time, the change over lever 82 is held with the latch lever 88, whereby the end 82b is at the position at which it engages with the upwards bent portion 64c1 of the above clutch spring 64c, so that along with the rotation of the motor M1 the worm 65 rotates in such a manner that the worm wheel 89 and the focus cam 89c making one body with the wheel 89 starts to rotate along the clockwise direction in the drawing. Along as the operatively engaging lever 53 of the focusing lens 52 follows the cam, being pulled with the spring 54 and the lift of the cam 89c decreases gradually, the focusing lens is withdrawn out of the very close position along the direction toward ∞. When the lift of the focus cam has become smaller than that of the pre-scan cam, the focusing lens 52 strikes against the stationary pre-scan cam so as to complete the focus adjustment.

Figure 3:
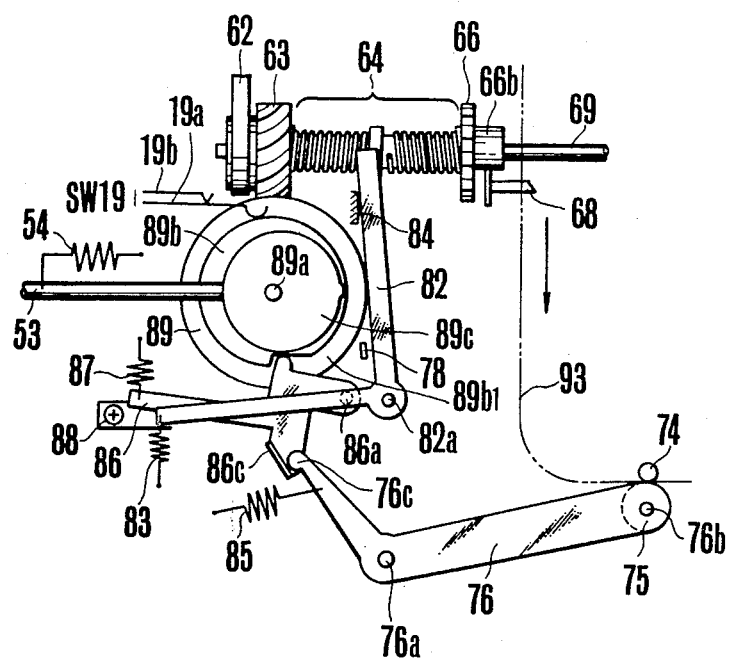
FIG. 3(A) shows the relation of the focus cam with the clutch after the termination of the automatic focus adjusting operation.
FIG. 3(B) shows the pre-scan cam in the above-mentioned state.
Figure 3:
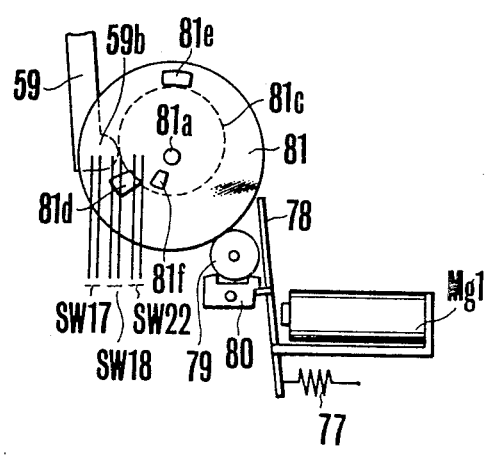

On the other hand, the focus cam further continues to rotate until the worm gear 89 rotates at about 180° out of the initial position (FIG. 2), when, as is shown in FIG. 3, the projection 86b of the start lever 86 falls into the notch 89b1 in the cam 89b by means of the strength of the spring 87.

Thus, the latch spring 88 holding the change over lever 82 at the above position is bent by means of the inclined portion 88b so as to release the lever 82, which rotates along the clockwise direction, being pulled with the spring 83, whereby the end 82b assumes the state in which it engages with the upwards bent portion 64d1 of the clutch spring 64d so as to allow the shutter gear 66 to start to run. Thus, the film feed operation and the shutter operation are started. Hereby, along with the movement of the cam portion 86c of the start lever 86, the above lever 76 rotates around the shaft 76a along the clockwise direction, being pulled with the spring 85 so as to press the pinch roller 75 against the capstan 74.

When the release button is pushed in this way, the focus adjustment is carried out and after that the photographing is carried out with the focusing lens kept in the in-focus state while the release button is being pushed.

Then, along with the returning of the release button 51 the switch SW16 is changed over from d to c, the frequency dividing oscillation circuit A stops operating, while the potential of the emitter of the transistor Tr8 becomes 0. At this time point the lens start switch SW17 is in the opened state, so that the transistor Tr8 is also brought in the switched on state and the transistor Tr7 is also brought in the switched on state. Thus, the magnet Mg1 is energized.

Thus, the lever 78 is attracted so as to free the anchor 80, while by means of the end 78b of the lever 78 the clutch lever 82 is changed over toward the right out of the state shown in FIG. 3, namely toward the driving side of the worm. As the result the film feeding stops, while the worm gear 89 starts to run.

Then the start lever 86 is again pushed down, whereby the latch spring 88 resumes the efficiency so as to keep the clutch lever 82 kept apart from the stop lever 84 by means of the magnet Mg1 and rotate the lever 76 in such a manner that the pinch roller 75 is put apart from the capstan 74 in order to stop the film feeding.

Hereby, while the focusing lens operatively engaging bar 53 is over the pre-scan cam 81c, the pre-scan cam cannot be rotated with the urging strength of the spiral spring 90, while after along with the rotation of the worm gear 89 the lift of the focus cam 89c has become equal to that of the above pre-scan cam, the pre-scan cam 81c and the gear 81 whose rotation is prohibited by means of the operatively engaging bar 53 rotate together with the worm gear 89 by means of the rotation of the spiral spring 90. When the contacts 17a and 17b come upon the conductive portion 81d in FIG. 1 after the cam 81c has made just one rotation out of the initial position, the charge switch SW17 is closed. Hereby, the potential at the point b in FIG. 2 becomes 0, the transistor Tr8 is brought in the switched off state and the magnet Mg1 in the non-excited state. Further, Tr3 is the switching transistor to be brought into the switched on state and the switched off state along with the closing and the opening of the switch 17. While the transistor Tr3 is in the switched on state, the diode D is kept switched off with the transistor Tr2 in the switched on state.

On the other hand the worm gear 89 continues to rotate even if the switch SW16 is changed over from d to c, whereby when the lever 53 is over the projection of the focus cam a part 19a of the contact of the switch SW19 falls into the notch 89b1 of the start cam 89b so as to open the switch SW19.

Consequently, the film driving motor M1 is switched off so as to stop the first gear.

Further, because the switch SW21 is opened along with the release of the second stroke of the release button 51, the capstan motor M2 and the EE circuit is switched off so as to be brought back in the initial state, whereby all the sequence is terminated.

During the above-mentioned operation, the focus cam and the pre-scan cam make only one rotation (360°) out of the initial state, so that the spiral spring resumes the energized initial state.

As explained above in detail, in accordance with the present invention the driving source for the automatic focus adjusting mechanism is not provided particularly, whereby the motor for driving the film or the shutter mechanism and so on is used in common so that the manufacturing cost can be reduced while the weight as well as the space can be economized. The driving power is changed over by means of the clutch mechanism so that the operation is stabilized, which is advantageous.

What is claimed is:

1. A camera having an automatic focus adjusting device comprising:
    shutter means;
    means for controlling the position of the focusing lens;
    an electric motor; and
    clutch means for selectively transmitting the driving power of the motor to the shutter or to the lens position control means.

2. A camera having an automatic focus adjusting device comprising:
    shutter means;
    means for controlling the position of the focusing lens;
    an automatic focus detecting circuit;
    means for presetting the adjusting position of the focusing lens by means of the output of the automatic focus detecting circuit;
    an electric motor;
    clutch means for selectively transmitting the driving power of the motor to the shutter means or the lens position control means; and
    spring means for driving the preset means, said means connecting the lens position control means to the adjusting position preset means so as to be energized with the driving power by means of the rotation of the motor.

3. A camera having an automatic focus adjusting device comprising:

shutter means;
cam means for controlling the position of the focusing lens;
an electric motor;
a spring clutch for selectively transmitting the driving power of the motor to the shutter or the cam means;
an automatic focus adjusting circuit;
cam means for presetting the stop position of the focusing lens by means of the output of the circuit; and
a spring for driving the preset cam means, said means connecting the lens control cam means to the preset cam means so as to be energized with the driving power by means of the rotation of the motor.

* * * * *